United States Patent [19]
McNeely et al.

[11] Patent Number: 5,309,111
[45] Date of Patent: May 3, 1994

[54] APPARATUS FOR MEASURING SKEW TIMING ERRORS

[75] Inventors: David L. McNeely; Greg A. Kranawetter, both of Indianapolis, Ind.

[73] Assignee: Thomson Consumer Electronics, Indianapolis, Ind.

[21] Appl. No.: 904,632

[22] Filed: Jun. 26, 1992

[51] Int. Cl.$^5$ .................. G01R 25/00; H03K 9/00
[52] U.S. Cl. .................... 328/133; 307/514; 307/516; 324/76.82
[58] Field of Search ............... 307/514, 516, 262, 269; 328/133, 155, 63, 72, 134; 324/83 D

[56] References Cited

U.S. PATENT DOCUMENTS

| | | | |
|---|---|---|---|
| 3,681,693 | 8/1972 | Hsueh | 324/83 D |
| 4,721,905 | 1/1988 | Mehrgardt | 307/514 |
| 4,926,115 | 5/1990 | Tarleton et al. | 328/133 |
| 5,138,320 | 8/1992 | Ngo et al. | 358/148 |

Primary Examiner—Timothy P. Callahan
Attorney, Agent, or Firm—Joseph S. Tripoli; Eric P. Herrmann; Ronald H. Kurdyla

[57] ABSTRACT

Apparatus for measuring skew in a clock signal for processing a video signal includes a cascade connection of a plurality of analog delay elements to which the clock signal is applied. The output connections of each analog delay element is coupled to a data input terminal of a respective storage element. A signal representative of the horizontal synchronizing signal is applied to the storage elements to simultaneously latch signal into the respective storage elements, thereby capturing a representative cycle of the sampling clock signal in the storage elements. Decoding circuitry is coupled to the storage elements for detecting the relative position of the e.g., leading transition of the sampling clock pulse immediately preceding the trailing transition of the horizontal pulse A ratio is calculated indicative of the skew error, which ratio corresponds to the position of the first transition, in units of delay, divided by the duration of the sampling clock period, in units of delay. In one embodiment presented, the ratio is a measure, as a fraction of a clock period, of the time interval between a predetermined transition of the horizontal synchronizing signal and the leading transition of the first sampling clock pulse following such predetermined transition.

10 Claims, 4 Drawing Sheets

APPARATUS FOR MEASURING SKEW TIMING ERRORS

This invention relates to apparatus for measuring timing errors in a video signal processing system, and more particularly for measuring the time duration or skew between a transition of a horizontal synchronizing pulse and a particular transition of a signal processing clock pulse.

BACKGROUND OF THE INVENTION

Video signal processing apparatus which process signals in sampled data format, typically sample the video signal at instants determined by a sampling clock signal, which desirably bears a fixed relationship to the horizontal synchronizing signals. In addition, to facilitate processing of the signal the clock signal desirably will have a frequency which is a multiple of the chrominance subcarrier frequency. If the multiple is an even number, e.g., 4, for standard signals, there will be an integer number of cycles per horizontal interval. If a fixed relationship is maintained between the sampling clock and the horizontal synchronizing signal, corresponding sampling points in successive lines will be vertically aligned. Conversely, if this relationship is altered, corresponding sampling intervals in successive lines will not be vertically aligned. If the sampled signals are stored and processed before display, the non vertical alignment of sampling intervals (and thus of pixels) will be manifested in reproduced images by jagged vertical edges. This situation occurs, when for example, video signals are derived from video cassette recorders and video disc players, and the signals are processed in sampled data format to provide special effects such as freeze frame or picture-in-picture. This problem and a corresponding solution is discussed in detail in U.S. Pat. No. 4,630,098, entitled "Progressive Scan Display System With Correction For Non-Standard Signals". However the apparatus shown for calculating the sampling error or skew is relatively complicated, and requires a relatively long time period to calculate respective skew errors.

SUMMARY OF THE INVENTION

The present invention comprises apparatus which measures skew as a fraction of a clock period and is relatively insensitive to device parameters. The sampling clock signal is applied to the cascade connection of a plurality of analog delay elements, sufficient in number to contain one full clock cycle. The output connections of each analog delay element is coupled to a data input terminal of a respective storage element. A signal representative of the horizontal synchronizing signal is applied to the storage elements to simultaneously latch signal into the respective storage elements, thereby capturing a representative cycle of the sampling clock signal in the storage elements. Decoding circuitry is coupled to the storage elements for detecting the relative position of the e.g., leading transition of the sampling clock pulse immediately preceding the trailing transition of the horizontal pulse A ratio is calculated indicative of the skew error, which ratio corresponds to the position of the first transition, in units of delay, divided by the duration of the sampling clock period, in units of delay.

DETAILED DESCRIPTION

Skew as defined herein is a measure of the time duration between a predetermined transition of a predetermined pulse of a clock signal and a predetermined transition of a timing datum. In the examples discussed herein the timing datum corresponds to a signal representative of horizontal sync, and the transition is the trailing transition of, e.g., the horizontal sync pulse. Desirably the predetermined transition of the clock signal is the leading transition of the first clock pulse following the trailing transition of the horizontal sync pulse. However such first clock pulse is not available for a time measurement at the occurrence of the trailing transition of the horizontal sync pulse. Therefore the measurement is made with respect to a clock pulse closely related in time such as the last clock pulse before the trailing transition of horizontal sync.

Figure 4:
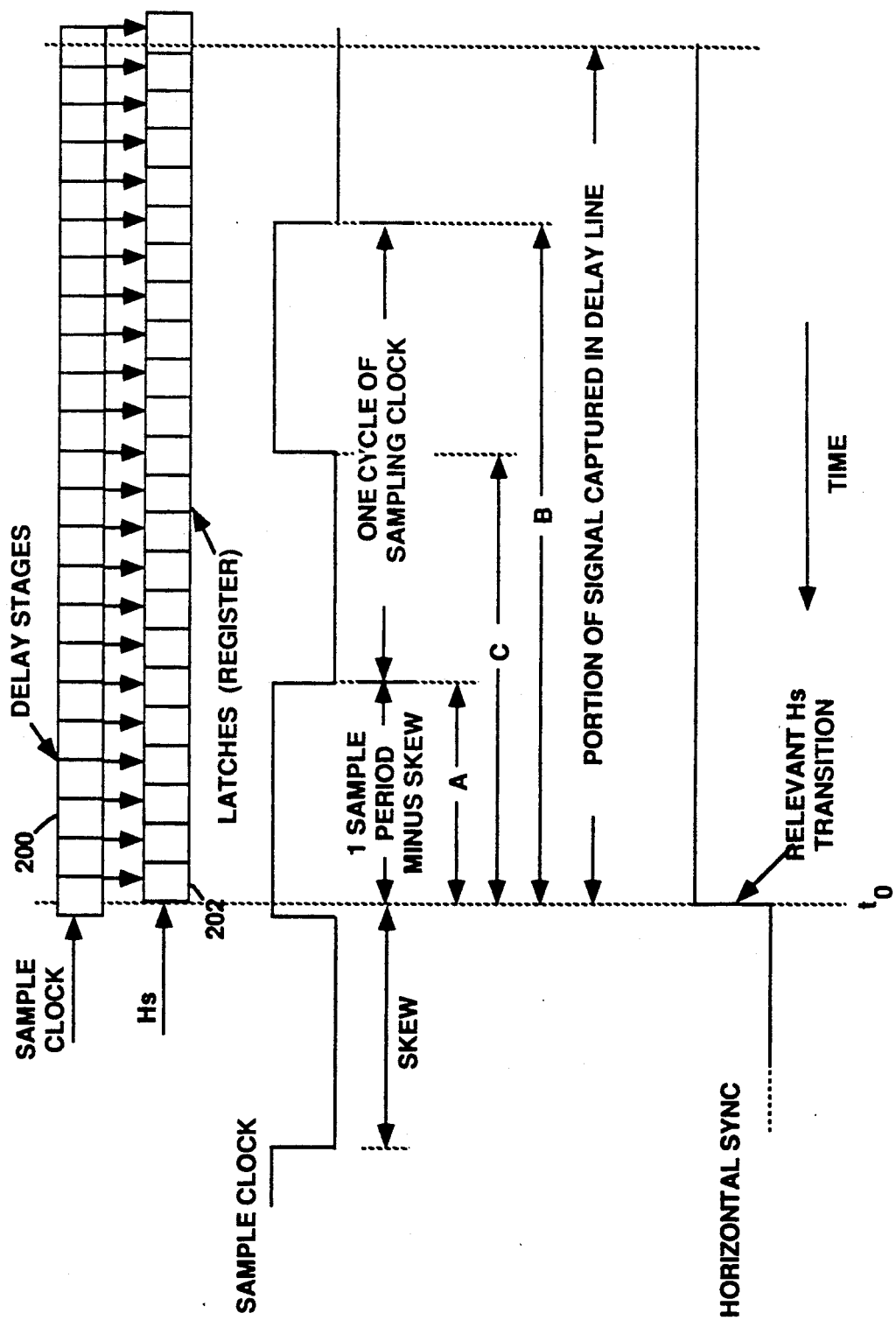
FIG. 4 is a timing diagram useful in describing operation of the invention.

Refer first to FIG. 4. Consider that time elapses from right to left with respect to the timing waveforms. The waveform designated "sample clock" is applied to an analog tapped delay line 200. Each box in element 200 represents a respective analog delay element which is serially connected to its adjacent delay elements. Nominally the analog delay line should include sufficient elements to incorporate two leading transitions of the sampling clock signal. Output connections from respective analog delay elements are coupled to respective data input connections of a plurality of storage elements 202. The horizontal synchronizing signal, or a signal derivative therefrom, (hereafter Hsync) is coupled to control input connections of the respective storage elements. On the occurrence of the trailing transition of the Hsync pulse, the signals resident in the respective analog delay elements of the delay line 200 are captured and latched in the respective storage elements.

Skew may be determined by counting the delay elements between the input of the cascade connected delay elements and the negative going transition of the last clock pulse occurring before the trailing transition of Hsync. (Note that when coursing through the storage elements from left to right, the leading transition of the sampling clock pulse is inverted.) This count corresponds to a value equal to one sample period minus skew in units of delay intervals. To determine skew one need only measure a sample period in delay elements and then subtract the count value. Finally in order to normalize the skew value to a percentage of a clock period the difference is divided by a sample period. For example assume that the positive going transition of the last clock pulse before the trailing transition of Hsync is A delay periods from the beginning of the delay line. Assume also that the positive transition of the second lastmost pulse is B delay periods from the beginning of the delay line. A clock pulse period is equal to B−A in delay periods. Skew on the other hand is $$\text{Skew} = (B - A) - A \qquad (1)$$

in delay units, and after being normalized is:

$$\text{Skew} = \frac{(B - A) - A}{(B - A)} \quad (2)$$

as a decimal equivalent of a portion of a clock period. If the clock signal is a square wave, it is not necessary that the delay line be long enough to accommodate the positive transitions of two prior clock pulses. The clock period may be measured by doubling the interval between any two consecutive transitions, such as A and C. In most applications using a skew value for processing video signals, both the skew value and its complement are required. Hence, in general either the skew value or its complement may be measured and the other calculated directly from the measured value.

Figure 1:
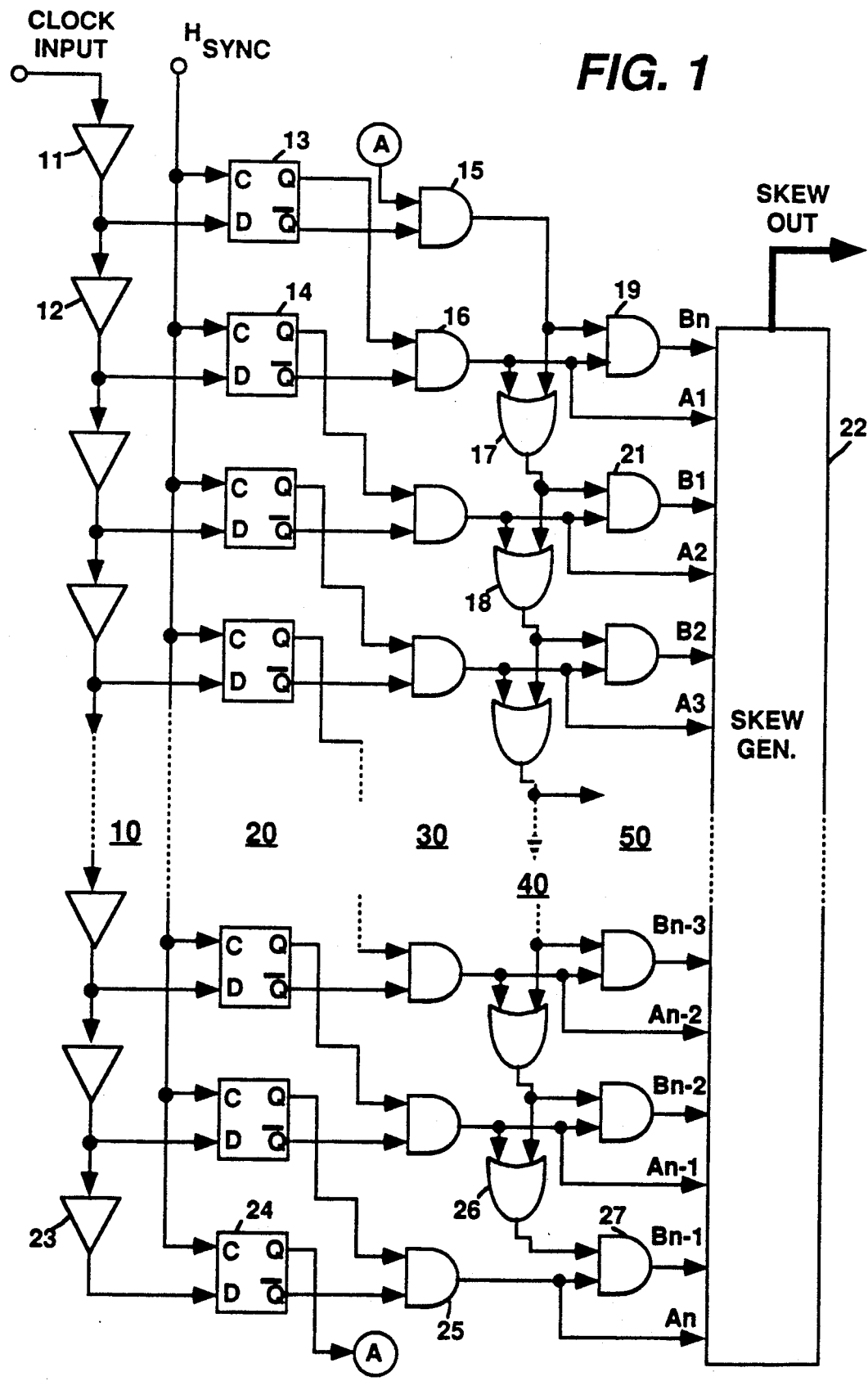
FIGS. 1, 3 and 5 are block diagrams of alternative embodiments of skew measuring circuitry.

FIG. 1 shows a first embodiment of a skew measuring circuit according to the present invention. A clock input signal subject to skew errors is coupled to a cascade connection 10 of delay elements (11, 12, 23). These delay elements may be buffer amplifiers having, for example, inherent processing delay times of four nanoseconds or less. The total delay time of the cascade connection is at least equal to one clock period. The output connections of each of the delay elements are coupled to respective ones of a plurality 20 of "D" type latches (13, 14, 24). The signal Hsync is coupled to the clock or control input connections of all of the latches 20, and on the relevant transition of the Hsync signal (at time $t_0$), conditions the latches to store the signal values exhibited at the output connections of the respective delay elements 10.

A plurality of AND gates 30 are coupled to successive pairs of latches. Each AND gate has a first input connection coupled to the Q output of a first latch and a second input connection coupled to the $\overline{Q}$ output of the next successive latch. The AND gates are thus arranged as transition detectors, for detecting negative going transitions (i.e. the leading or positive going transitions of the clock pulses stored in the latches.

The output terminals of the AND gates 30 are coupled to respective input connections of a SKEW generator 22. The respective output connections of the AND gates 30 are also coupled to input terminals of an enable "daisy chain" of OR gates 40 and respective input terminals of a second plurality of two-input AND gates 50. Output connections from the daisy chain are coupled to the second input terminals of the respective AND gates 50. Initially all the AND gates 50 are disabled by the daisy chain or OR gates. The one of the AND gates 30 which detects a transition closest to the input of the delay line (closest to the top of the figure), applies a logic one value to the OR gate coupled thereto, which in turn causes a logic one to be applied to all successive OR gates. The OR gates exhibiting logic one values enable the AND gates (of plurality 50) respectively coupled thereto to pass logic values coupled from the plurality of AND gates 30. Output connections of the AND gates 50 are coupled to the Skew generator 22.

Any one of the respective AND gates 30 may detect a transition, and at least two of the AND gates 30 will concurrently detect such transistions. All such detections are coupled directly to the generator 22. Responsive to these detections the generator 22 determines the position of the leading transistion of the last clock pulse before the occurrence of Hsync (e.g. value A of equation 1).

The AND gates 50 being enabled/disabled by the daisy chain of OR gates will pass the detection signals from all but the AND gate 30 which detects the transition closest the input of the delay line. Responsive to the logic levels provided by the second plurality of AND gates 50 the generator 22 determines the location of the leading transition of the second lastmost clock pulse (e.g., value B of equation 1).

Once the relative locations of the leading transitions of the two clock pulses are determined Skew generator 22 calculates the skew value according to equation 1 or 2 for example. The generator 22 may be a memory programmed at address locations with skew values corresponding to the appropriate combination of values input to address busses Ai and Bi. Note however, that if there are 20 delay stages, then in the FIG. 1 example there will be 40 address lines implying a memory of $2^{40}$ storage locations. However there cannot be $2^{40}$ different combinations of logic values generated on the 40 address lines Ai and Bi. Thus using memory for decoding the skew value is possible but not practical. Recall that the Ai address lines include detection of transistions for both the first and second clock pulses prior to time $t_0$. This is all the information needed to calculate either equation 1 or 2, thus the generator 22 may be realized with a memory having 20 address input lines and only $2^{20}$ address locations. However this is still not a very practical solution because of the limited number of valid input combinations that can occur on the address input lines.

Figure 2:
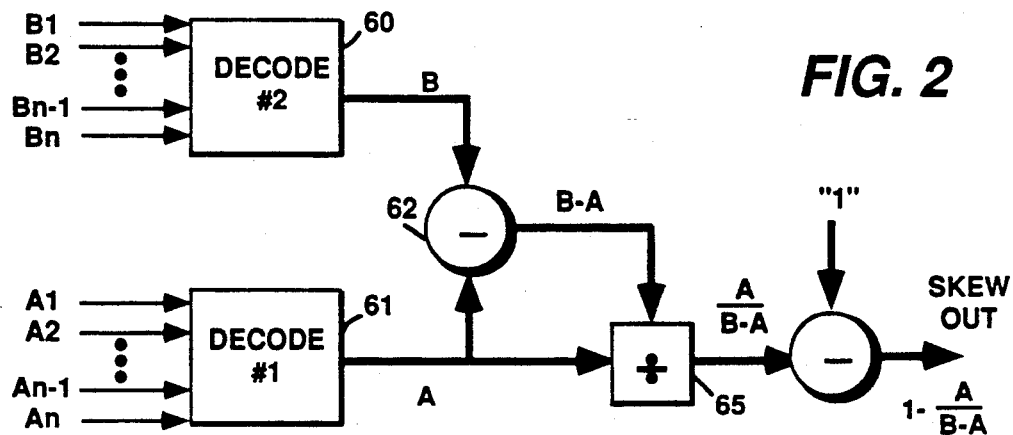
FIG. 2 is a block diagram of exemplary circuitry which may be implemented for element 22 of the FIG. 1 apparatus.

FIG. 2 illustrates a more parts efficient approach to a skew generator 22. In FIG. 2, the output values Ai from the AND gates 30 are coupled to a first decoder 61, and the output values Bi from the AND gates 50 are coupled to a second decoder 60. The logic in the first and second decoders may be similar to the logic utilized in flash analog to digital decoders which assign mutually exclusive values to the one of a plurality of hierarchically arranged logic outputs exhibiting a state different from the others. In this instance the mutually exclusive values correspond to the location (count) of the detected transition in delay units. Decoders 61 and 60 provide the values A and B as they relate to equations 1 and 2.

The values A and B from decoders 61 and 60 are coupled to respective input connections of a subtracter which generates the magnitude of their difference $|B-A|$. The difference and the value A are coupled to a divider 65 which generates the quotient $A/|A-B|$. This quotient is applied to a subtraction circuit 66 which generates output values $(1 - A/|A-B|)$, which values are equivalent to the skew values of equation 2. Note that these skew values are realized in fractions of a sample clock period, with the resolution determined by the number of delay elements used to realize a total delay of one clock cycle. Skew values of this form may not be useful for certain applications, but in general may be transformed to other forms simply by scaling the output of the subtraction circuit 66.

It should be appreciated that all of the elements of FIG. 2 may be subsumed into a single processing element such as a state machine.

Figure 3:
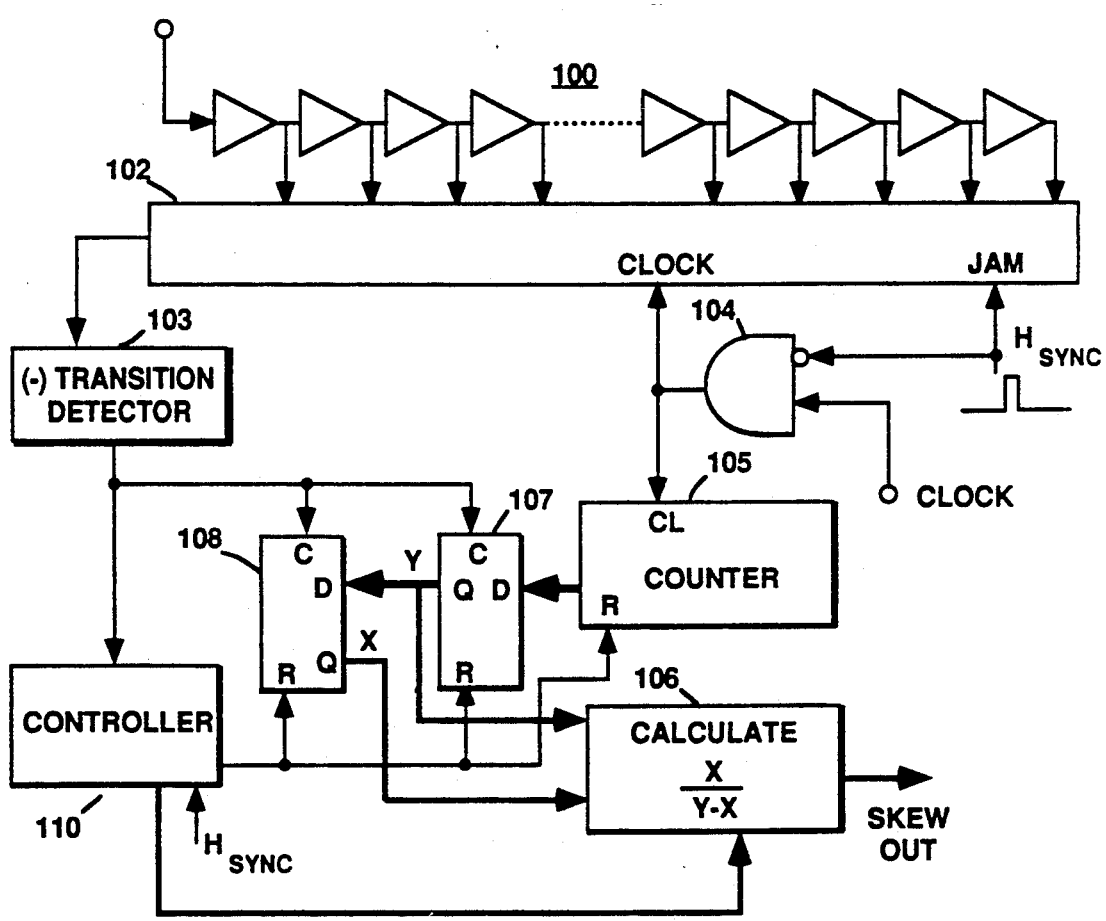

FIG. 3 illustrates a further example of the invention which includes a tapped analog delay line 100 to which a sampling clock signal subject to skew errors is applied. The respective taps of the delay line 100 are coupled to parallel input connections of a parallel-input-serial-output shift register 102. The shift register 102 has a JAM input coupled to the Hsync signal, and responsive to the appropriate transition of the Hsync signal, loads the current contents of the delay line 100 into the shift register 102. After loading of the shift register, a clocking signal is applied via an AND gate 104 to a clock input terminal of the shift register to serially read the data stored in the register. The clock signal applied to the shift register is also applied to a binary counter 105 which counts clock pulses. Count values provided by the counter 105 are applied to the data input terminals of a first "D TYPE" latch 107. The output of the latch 107 is coupled to the data input of a second "D TYPE" latch 108. Clock or control input terminals of the "D TYPE" latches are coupled to a transition detector 103. The transition detector 103 is responsive to the data read out of the register 102. On the first occurrence of a transition corresponding to the leading transition of the sampling clock signal read out of the register, the latch 107 is conditioned to store the current count value exhibited by the counter 105. This count value corresponds to the value A as defined for equations 1 or 2. On the second occurrence of a transition corresponding to the leading transition of the sampling clock signal read out of the register 102, latch 108 is conditioned to store the count value A stored in the latch 107, and latch 107 is conditioned to store the current count value exhibited at the output of the counter 105. This latter count value corresponds to the value B as defined for equations 1 or 2. The values A and B stored in the latches 107 and 108 are coupled to a calculating circuit 106 which generates a skew value according to equation 2 for example.

The examples illustrated in FIG. 1–3 tended to apply similar algorithms for calculating skew values. One may use different ones of the sampling clock transitions captured in the storage elements (registers) and arrive at similar results.

Figure 5:
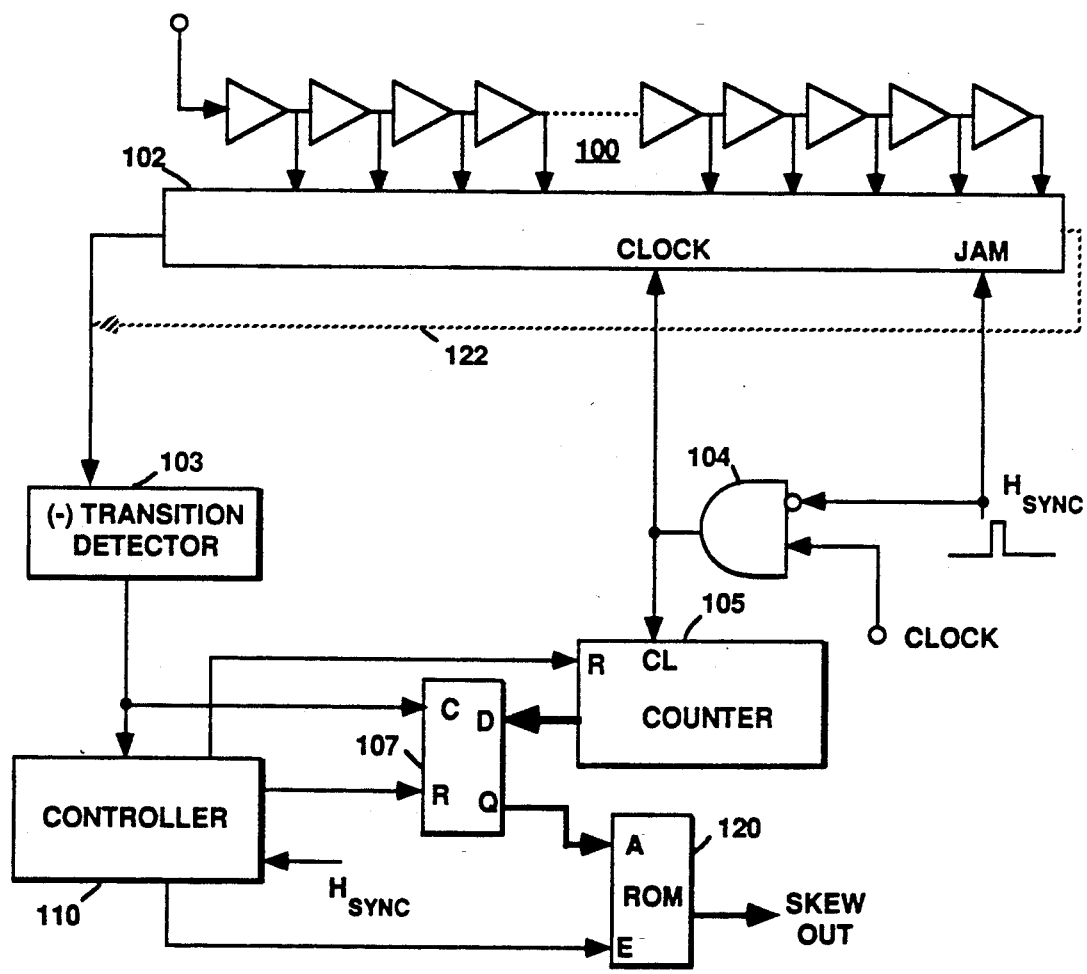

Wolfgang Gollinger et al. in U.S. Pat. No. 4,489,342 have demonstrated a method for biasing a cascade connection of analog delay devices (e.g., 100) to exhibit a total delay exactly equal to one period of a clock signal applied thereto. Knowing the number of analog delay stages utilized in the cascade connection it is only necessary to know the location (A) of one transition of the sampling clock signal captured in the storage elements (20 or 102). The total number of delay stages corresponds to B−A. Assume that this number equals 16, which can be represented by a four-bit binary number. The location, A, of the leading transition of the sampling clock signal can therefore be represented by a four-bit binary number. Considering the foregoing conditions, the circuitry of FIG. 3 may be modified, as shown in FIG. 5, by eliminating latch 108 and substituting the calculator 106 with a simple preprogrammed read-only-memory (ROM), 120, having only 16 storage locations. Each of these locations is programmed with a skew value 1−A/N where N is the number of delay stages in the cascade connected delay line, and which is assumed to be 16 in the present example, and the values A correspond to respective addresses. The latch 107 captures the count value at the leading transition of the captured clock signal and applies this count value as an address to the ROM 120. Responsive to the address value the ROM outputs a skew value. (Note, elements in FIG. 5 designated with the same numbers as elements in FIG. 3 are similar and perform the same functions, except that the delay line 100 of FIG. 5 is of the type that is arranged to have its total delay equal one sampling clock period.)

A further simplification involves reversing the direction that the register 102 is read out. If the transition detector 103 is coupled to the opposite end of the register 102, as indicated by the dashed line 122, the location (count value) of the leading transition of the captured sampling clock pulse will equal the measure of skew in units of delay. This value may be normalized by dividing the count by N. In this instance the ROM 120 is programmed at respective address locations with skew values equal to A/N.

The embodiment of FIG. 1 is preferred in applications where the skew value must be calculated within a minimum number of clock sample periods. The embodiments of FIGS. 3 or 5 are preferred if the skew calculation time is not critical, since these embodiments generally utilize less complicated hardware.

What is claimed is:

1. Apparatus for measuring skew between a predetermined transition of a clock signal and a predetermined transition of a further signal, comprising:

a source of said clock signal, and a source of said further signal;

a non-clocked analog delay line, coupled to receive said source of clock signal, and having a plurality of taps for providing a plurality of delayed replicas of said clock signal delayed by substantially equal increments;

means, responsive to said predetermined transition of said further signal, for simultaneously storing said delayed replicas exhibited at each of said taps;

means, coupled to said means for storing, for determining the location, in units of delay, of said predetermined transition of said clock signal in said means for storing; and means, responsive to said location, for generating said skew value.

2. Apparatus for measuring skew between a predetermined transition of a clock signal having a given cycle period, and a predetermined transition of a further signal, comprising:

a source of said clock signal, and a source of said further signal;

an analog delay line, coupled to receive said source of clock signal, and having a plurality of taps for providing a plurality of delayed replicas of said clock signal delayed by substantially equal increments:

means, responsive to said predetermined transition of said further signal, for simultaneously storing said delayed replicas exhibited at each of said taps:

means, for determining the location, in units of delay, of said predetermined transition of said clock signal in said means for storing; and means, coupled to said means for storing, and responsive to said location, for generating said skew value as a function of said location divided by the cycle period of said clock signal.

3. The apparatus set forth in claim 2 wherein said means for determining the location of said predetermined transition of said clock signal, further includes means for measuring said cycle period in units of delay.

4. The apparatus set forth in claim 2 wherein said means for simultaneously storing signal exhibited at each of said taps includes a plurality of ordinally numbered latches having respective data inputs respectively coupled to corresponding ordinally numbered ones of said taps, and having respective output terminals coupled to decoding means, said decoding means providing values indicating the relative location of at least one of said predetermined transitions of said clock signal, and calculating means responsive to said values indicating said location for generating said skew value.

5. Apparatus for measuring skew between a predetermined transition of a clock signal and the predetermined transition of a further signal, comprising:
   a source of said clock signal, and a source of said further signal;
   an analog delay line, coupled to said source of clock signal, and having a plurality of taps for providing a plurality of delayed replicas of said clock signal delayed by substantially equal increments;
   means, including a plurality of ordinally numbered latches, responsive to said predetermined transition of said further signal for simultaneously storing signal exhibited at each of said taps, having respective data inputs respectively coupled to corresponding ordinally numbered ones of said taps, and having respective output terminals;
   decoding means, having input terminals coupled to the output terminals of said plurality of latches and arranged to provide a first value, A, indicating said location of said predetermined transition of said clock signal, and a second value B indicating the location in delay units of a second transition, and;
   calculating means arranged to generate said skew value as a function of A divided by the difference between A and B.

6. Apparatus for measuring skew between a predetermined transition of a clock signal and the predetermined transition of a further signal, comprising;
   a source of said clock signal, and a source of said further signal;
   an analog delay line, coupled to said source of clock signal, and having a plurality of taps for providing a plurality of delayed replicas of said clock signal delayed by substantially equal increments;
   a parallel-input-serial-output shift register, having parallel input terminals coupled to respective ones of said taps, having an output terminal, and having a control input terminal coupled to said source of said further signal for parallel loading said shift register responsive to said predetermined transition of said further signal
   means including a transition detector coupled to said output terminal of said parallel-input-serial-output shift register, for determining the location, in units of delay, of said predetermined transition of said clock signal; and
   means, responsive to said location, for generating said skew value.

7. The apparatus set forth in claim 6 wherein said means for determining the location, in units of delay, of said predetermined transition of said clock signal includes;
   means for applying a clocking signal to said shift register for serially reading data out of said shift register to said transition detector;
   counting means for counting pulses of said clocking signal applied to said shift register, and providing respective count values;
   latch means, responsive to said transition detector for storing said count value.

8. The apparatus set forth in claim 7 further including means responsive to count values stored in said latch means for providing said skew value as a function of a count value corresponding to said predetermined transition of said clock signal divided by the period of one cycle of said clock signal.

9. The apparatus set forth in claim 7 wherein said latch means includes means for storing a first value, A, corresponding to the location in said shift register of a first transition of said clock signal, and a second count value, B, corresponding to the location in said shift register of a second transition of said clock signal; and
   said means for generating said skew value, generates such value as a function of $A/(B-A)$.

10. The apparatus set forth in claim 7 further including a memory having an address input port coupled to said latch for applying said count values as memory addresses, and having respective address locations programmed with said skew values.

* * * * *